USOO8661208B2

(12) United States Patent
Warner et al.

(10) Patent No.: US 8,661,208 B2
(45) Date of Patent: Feb. 25, 2014

(54) NON-INCLUSIVE CACHE SYSTEMS AND METHODS

(75) Inventors: Craig Warner, Addison, TX (US); Dan Robinson, Allen, TX (US); John Wastlick, Allen, TX (US); Michael Schroeder, Plano, TX (US); Jeffrey Moy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1638 days.

(21) Appl. No.: 11/733,857

(22) Filed: Apr. 11, 2007

(65) Prior Publication Data

US 2008/0256306 A1 Oct. 16, 2008

(51) Int. Cl.
*G06F 13/00* (2006.01)
*G06F 13/28* (2006.01)

(52) U.S. Cl.
USPC .................. 711/152; 711/151; 711/141

(58) Field of Classification Search
USPC ................ 711/141, 150, 154, 118
See application file for complete search history.

(56) References Cited

U.S. PATENT DOCUMENTS

| 5,787,478 | A  | * | 7/1998  | Hicks et al. ............... | 711/141 |
| 5,987,571 | A  | * | 11/1999 | Shibata et al. ............. | 711/141 |
| 6,061,766 | A  | * | 5/2000  | Lynch et al. .............. | 711/146 |
| 6,704,843 | B1 | * | 3/2004  | Arimilli et al. ............ | 711/146 |
| 6,715,040 | B2 | * | 3/2004  | Wang et al. ............... | 711/133 |
| 6,782,455 | B2 | * | 8/2004  | Palanca et al. ............ | 711/143 |
| 6,871,267 | B2 | * | 3/2005  | Freerksen et al. .......... | 711/146 |
| 6,928,522 | B2 | * | 8/2005  | Yang ...................... | 711/144 |
| 7,496,715 | B1 | * | 2/2009  | Vartti et al. .............. | 711/144 |
| 2005/0086439 | A1 | * | 4/2005 | Kaczynski ................ | 711/151 |

* cited by examiner

*Primary Examiner* — Reginald Bragdon
*Assistant Examiner* — Eric S Cardwell

(57) ABSTRACT

Non-inclusive cache systems and methods are provided. In one embodiment a non-inclusive cache system is provided comprising a non-inclusive cache and a cache agent that receives a request for access to the non-inclusive cache and denies the request for access to the non-inclusive cache if the non-inclusive cache system exceeds a predetermined level of activity.

20 Claims, 7 Drawing Sheets

NON-INCLUSIVE CACHE SYSTEMS AND METHODS

BACKGROUND

In modern multi-processor systems that employ inclusive cache systems, processor cache memories often maintain multiple copies of data. In an inclusive cache system, when one processor alters one copy of the data, it is necessary to update or invalidate all other copies of the data which may appear elsewhere in the multi-processor system. Thus, in a system that employs an inclusive cache, to ensure coherency among the multiple copies of the data, every valid write to one copy of the data must update or invalidate all other copies of the data.

DETAILED DESCRIPTION

A non-inclusive cache is typically implemented as a shared cache in a multi-level cache hierarchy with at least one cache of the multi-level cache hierarchy at a lower level (e.g., closer proximity to an associated processor) than the non-inclusive shared cache. Additionally, the lower level cache can have at least one coherent copy of cache line data that is not stored in the non-inclusive shared cache.

Figure 1:
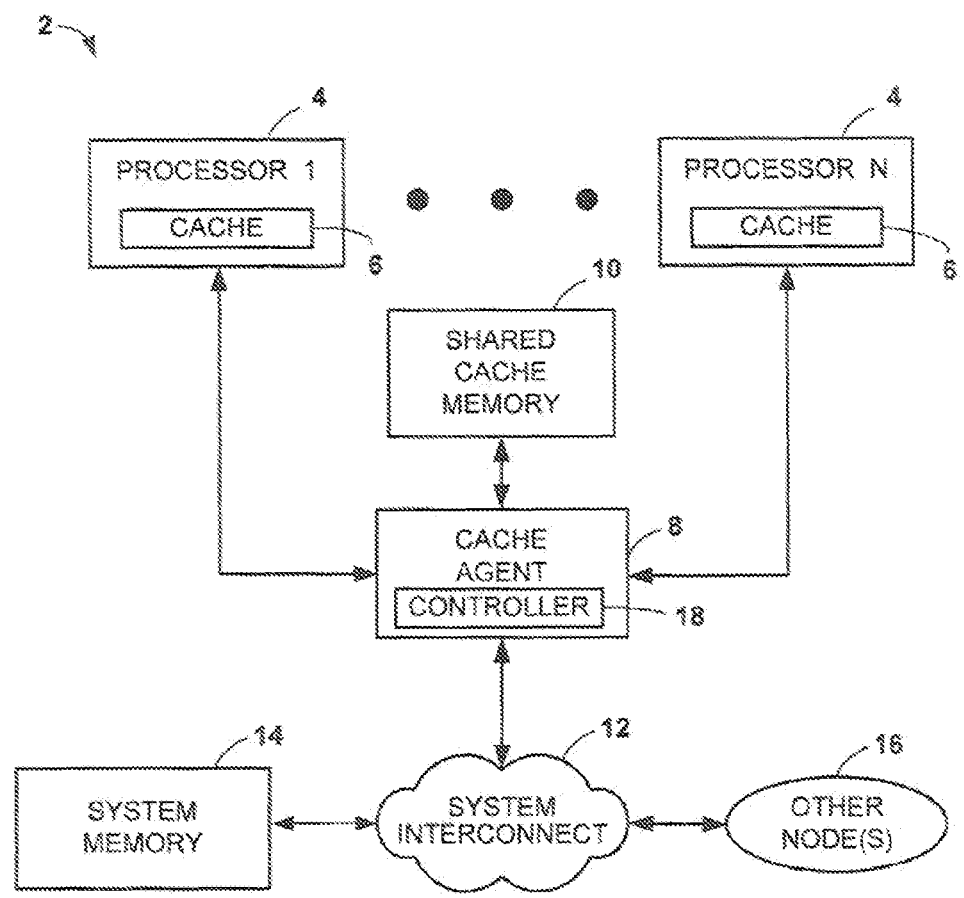
FIG. 1 depicts an exemplary embodiment of a multi-processor system.

FIG. 1 depicts an exemplary embodiment, of a multi-processor system 2. The system 2 includes N processors 4, where N is an integer greater than or equal to one. Bach of the N processors 4 includes a local cache 6. The N processors 4 could be implemented cm one or more integrated circuit chips. The N processors 4 can be communicatively coupled to a cache agent 8 that controls access to a shared cache memory 10. The shared cache memory 10 could be implemented as static or dynamic random access memory (RAM). The cache agent 8 also mediates requests for access between the N processors 4 and systems connected via a system interconnect 12 such as a system, memory 14 and other nodes 16 (e.g.; other processors). The system memory 14 could be implemented, for example, as static or dynamic RAM.

The cache agent 8 can include a controller 18 that processes requests received from one of the N processors 4 or the other nodes 16. As one example, a request could be a request to read data from the shared cache memory 10 (e.g., a "read request"). The read request could be issued by one of the N processors 4 (e.g., a requesting processor) when the one processor 4 receives a cache miss during an attempt to read or write data at the one processor's 4 respective local cache 6. The controller 1S could allow the read request to access the shared cache memory 10 if a level of activity of the cache agent 8 and/or the shared cache memory 12 is below a predetermined level. The level of activity could be determined, for example, by examining the size of read and/or write queues to the shared cache memory 10. It is to be appreciated that a variety of methodologies and/or systems could be employed to determine the level of activity. The predetermined level of activity could be programmable, and could vary based on the type of requests for access to the shared cache memory 10. The types of requests could be implemented, for example as a read request a write request or a snoop to name a few. If the shared cache memory 10 contains a coherent copy of the requested data, the cache agent 8 forwards the coherent copy of the requested data to the requesting processor 4. However, if the level of activity of the cache agent 8 and/or the shared cache memory 10 is at or above the predetermined level of activity, the read request could be denied, such that, the cache agent 8 forwards the read request to the system memory 14 and/or the other nodes 16 via the system interconnect 12.

Additionally, the read request can be forwarded to the system memory 14 and/or the other nodes 16 if the shared cache memory does not contain a coherent copy of the requested data. In response to the forwarded read request typically a response to the read request is issued to the cache agent 8 via the system interconnect 12, which response can be forwarded to the requesting processor 4 by the cache agent 8.

In another example, the request for access could be implemented as a writeback of data (writeback data) associated with one more cache lines of a processor's local cache 6. A writeback request could be performed by one of the N processors 4 ("the writing processor" 4), for example, during a cache line eviction procedure. The controller 18 could allow the writeback request to access the shared cache memory 10 if the cache agent 8 and/or the shared cache memory 10 are below the predetermined level of activity discussed above. If the shared cache memory 10 allows the writeback request to access the shared cache memory 10, the controller 18 can allocate one or more cache lines of the shared cache memory 10 for storage of the writeback data and the cache agent 8 writes the writeback data to the shared cache memory 10. The cache agent 8 also provides the writing processor 4 with a completion signal indicating that the writeback is complete. It is to be understood that the completion signal could be provided to the writing processor 4 before the writeback, data is written to the shared cache memory 10.

Alternatively, if the level of activity is at or above the predetermined level, the cache agent 8 can deny the writeback request. If the writeback request is denied, the cache agent 8 typically forwards the writeback request to the system memory 14 via the system interconnect 12. Typically, the system memory 14 can respond to the writeback request by providing a system memory completion signal to the cache agent 8, and the cache agent 8 can provide the completion signal discussed above to the writing processor 4. It is to be understood that the completion signal could be provided to the writing processor 4 before the system memory completion signal is provided to the cache agent 8.

In yet another example the request for access, could be implemented as a snoop for data at the cache (e.g., a "snoop"). The snoop could be issued by one of the other nodes 16 via the system interconnect 12. The controller 18 could allow the snoop to access the shared cache memory 10 if the cache agent 8 and/or the shared cache memory 10 are below the predetermined level of activity discussed above. If the shared cache memory 10 contains a coherent copy of the requested data, and the coherent copy is exclusively owned by the shared cache memory 10, the cache agent 8 can forward the coherent copy of the requested data to the other node 16 via the system interconnect 12. However, if the level of activity of the cache agent 8 and/or the shared cache memory 10 is at or above the predetermined level of activity, and if the local caches 6 associated with the N processors 4 do not contain a coherent copy of the requested data, the snoop could be denied access, such that the cache agent 8 responds to the snoop with an invalid signal indicating that the shared cache memory 10 does not contain a coherent copy of the requested data.

Figure 2:
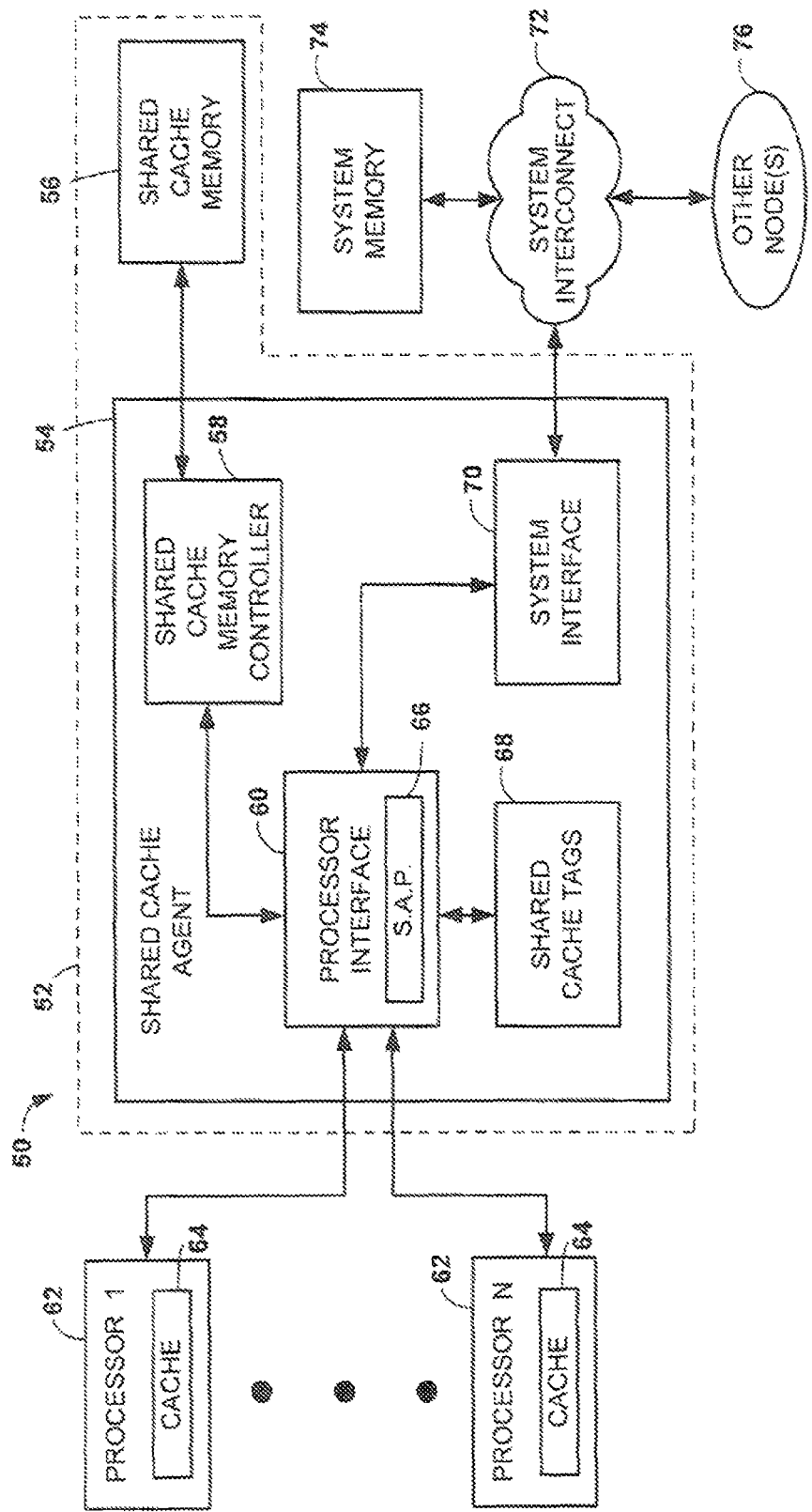
FIG. 2 depicts another exemplary embodiment of a multi-processor system.

FIG. 2 depicts another exemplary embodiment of a multi-processor system 50. The multi-processor system 50 includes a non-Inclusive cache system 52. The non-inclusive cache system 52 can include a shared cache agent 54 and a shared cache memory 56. The shared cache memory 56 could be implemented, for example, as a RAM (static or dynamic) that can include one or more cache lines that store data. The shared cache agent 54 can include a shared cache memory controller 58 that can read and write data to the shared cache memory 56. The shared cache memory controller 58 can include one or more input and/or output, data, queues for reading and writing data to the shared cache memory 56. The shared cache memory 56 and/or shared cache tags 68 form a non-inclusive cache.

The shared cache agent 54 can include a processor interlace 60 that processes read and write requests from N processors 62, where N is an integer greater than or equal to one. The N processors 62 could be implemented on one or more integrated circuit chips. Each of the N processors 62 can include at least one local cache 64. The local cache 64 associated with each processor 62 can be closer in proximity to the associated processor 62 than the shared cache memory 56. Additionally, the local caches 64 could include one or more cache lines of data not stored in the non-inclusive cache system 52. The processor interface 60 can include a shared access pipeline (S.A.P.) 66 that controls operations performed by the shared cache agent 54. The processor interface 60 can also access a plurality of shared cache tags 68 that can identify a coherency state of one or more (typically four) cache lines, a shared cache memory address location as well as the owner or owners (e.g., a cache 64 associated with, one or more of the processors 62 or the shared cache memory 56) of the respective cache line. As an example, the shared cache tags 68 can employ a modified, exclusive, shared and invalid (MESI) coherency protocol that can indicate, if a particular cache line is: exclusively owned and unmodified ('E' state), exclusively owned, unmodified and not stored by any of the caches 64 (e.g., uncached) associated with the N processors 62 ('Eu' state) exclusively owned and modified ('M' state), exclusively owned, modified and not stored by any of the caches 64 (e.g., uncached) associated with the N processors 62 ('Mu' state), shared by at least two different caches ('S' state) or Invalid ('I' state).

The processor interface 60 can also communicate with a system interlace 70. The system interface 70 can process, such as through a plurality of buffers, data transfers on a system interconnect 72 between the shared cache memory 56 and/or one or more of the N processors 62 and a system memory 74 or other nodes 76. The system memory 74 could be implemented, for example, as static RAM or dynamic RAM. The other nodes 76 could be implemented, for example, as additional processors that could also include one or more associated caches.

Figure 3:
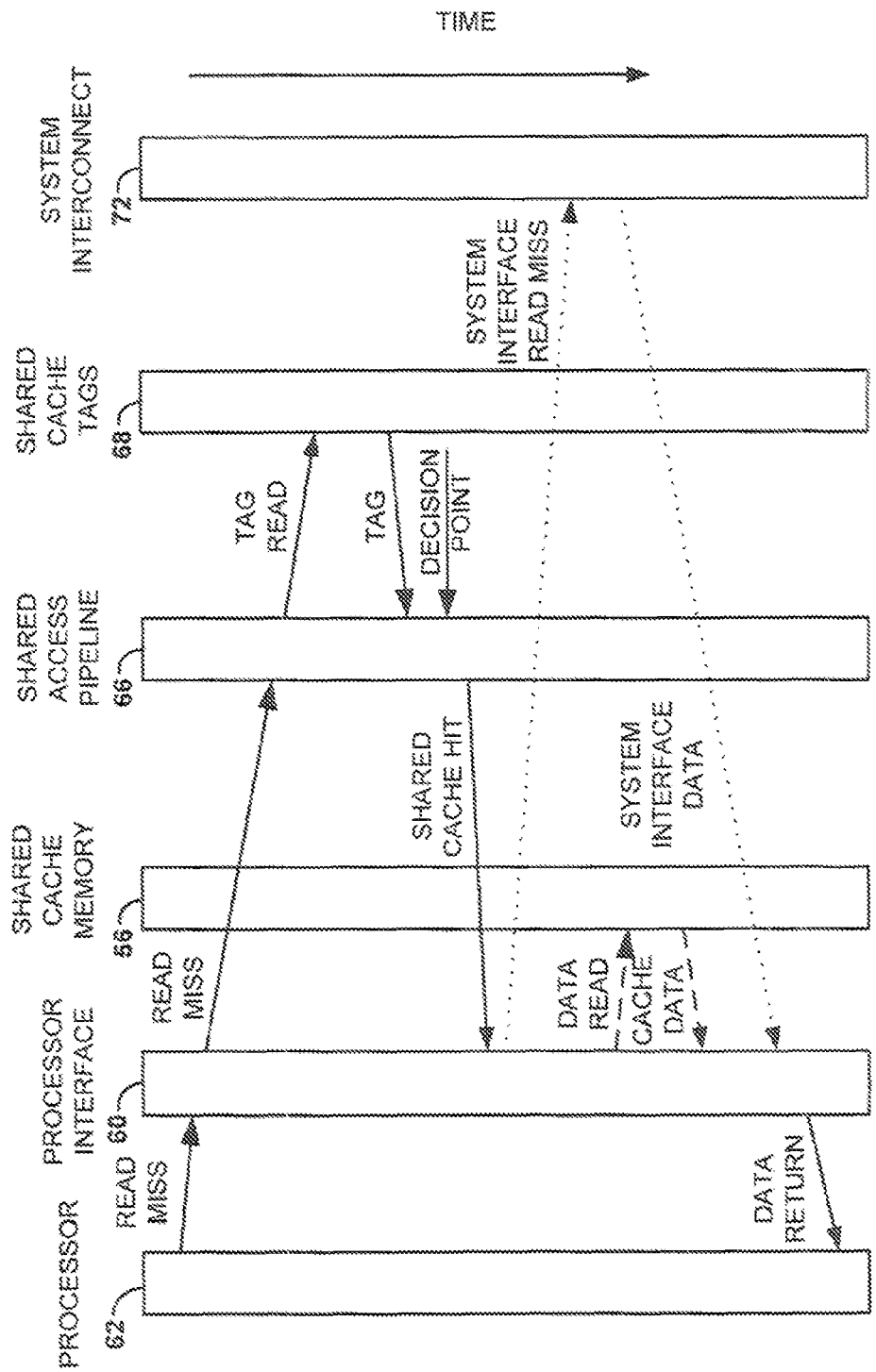
FIG. 3 depicts an exemplary embodiment of the multi-processor system illustrated an FIG. 2 processing a READ MISS.

FIG. 3 depicts an exemplary embodiment of the multi-processor system 50 illustrated in FIG. 2 processing a READ MISS from one of the N processors 62, wherein the shared cache memory 56 contains a coherent copy of requested data (e.g., a shared cache memory 56 hit). In FIG. 3, the signals are processed sequentially in reference to a time indicator (TIME). Additionally, signals in FIG. 3 with similar broken line patterns indicate a particular course of action if certain conditions are met, the conditions being discussed below, A READ MISS can be issued by one of the N processors 62, for example, if the processor 62 searches an associated local cache 64 for one or more cache lines of data and the one or more cache lines have an invalid coherency state (an 'I' state). The processor 62 issues the READ MISS to the processor interface 60, the READ MISS requests a coherent copy of data stored in a particular cache line. In response, the processor interface 60 processes the READ MISS at the shared access pipeline 66. The shared access pipeline 66 causes the processor interface 60 to request a shared cache tag (TAG READ) from the shared cache tags 68 that is associated with the cache line requested by the READ MISS. When the shared cache tag is returned to the shared access pipeline 66 (TAG), the shared access pipeline 66 identifies the coherency state of the cache line, and identifies the owner(s) of the cache line.

At a DECISION POINT, a determination (based on a condition discussed below) is made by the shared access pipeline 66 if the shared cache memory 56 stores a coherent copy of the data (SHARED CACHE BIT). If the determination is positive, data requested by the READ MISS can be read (DATA READ) from the shared cache memory 56 and forwarded to the processor 62 (CACHE DATA).

Alternatively, if the determination is negative at the DECISION POINT, the processor interface 60 can issue a SYSTEM INTERFACE READ MISS at the system interconnect 72, even if the shared cache tag returned to the processor interface 60 indicates that the shared cache memory 56 contains a coherent copy of the data (e.g., SHARED CACHE HIT). The processor interface 60 then typically receives a response to the SYSTEM INTERFACE READ MISS that includes a coherent copy of the data requested by the processor 62 (SYSTEM INTERFACE DATA). The SYSTEM INTERFACE DATA can be forwarded to the processor 62 (DATA RETURN) by the processor interface 60.

The determination at the DECISION POINT can be made based on at least the following condition. The condition could be based on an examination of a current level of activity of the non-inclusive cache system 52. The level of activity of the non-inclusive cache system 52 can be determined, for example, by the shared access pipeline 66 examining the size of one or more I/O data queues at the shared cache memory controller 58, the shared cache memory 56 and/or the system interface 70. If the level of activity of the non-inclusive cache system 52 is determined to be below a programmable threshold value, the condition could be positive, hut if the level of activity is determined to be at or above the programmable threshold value, the condition could be negative. If the condition is negative, the determination, at the DECISION POINT can be negative. Alternatively, if the condition is positive, the determination at the DECISION POINT can be positive. It will be appreciated by those skilled in the art that other combinations of conditions, and/or other conditions can be considered.

Figure 4:
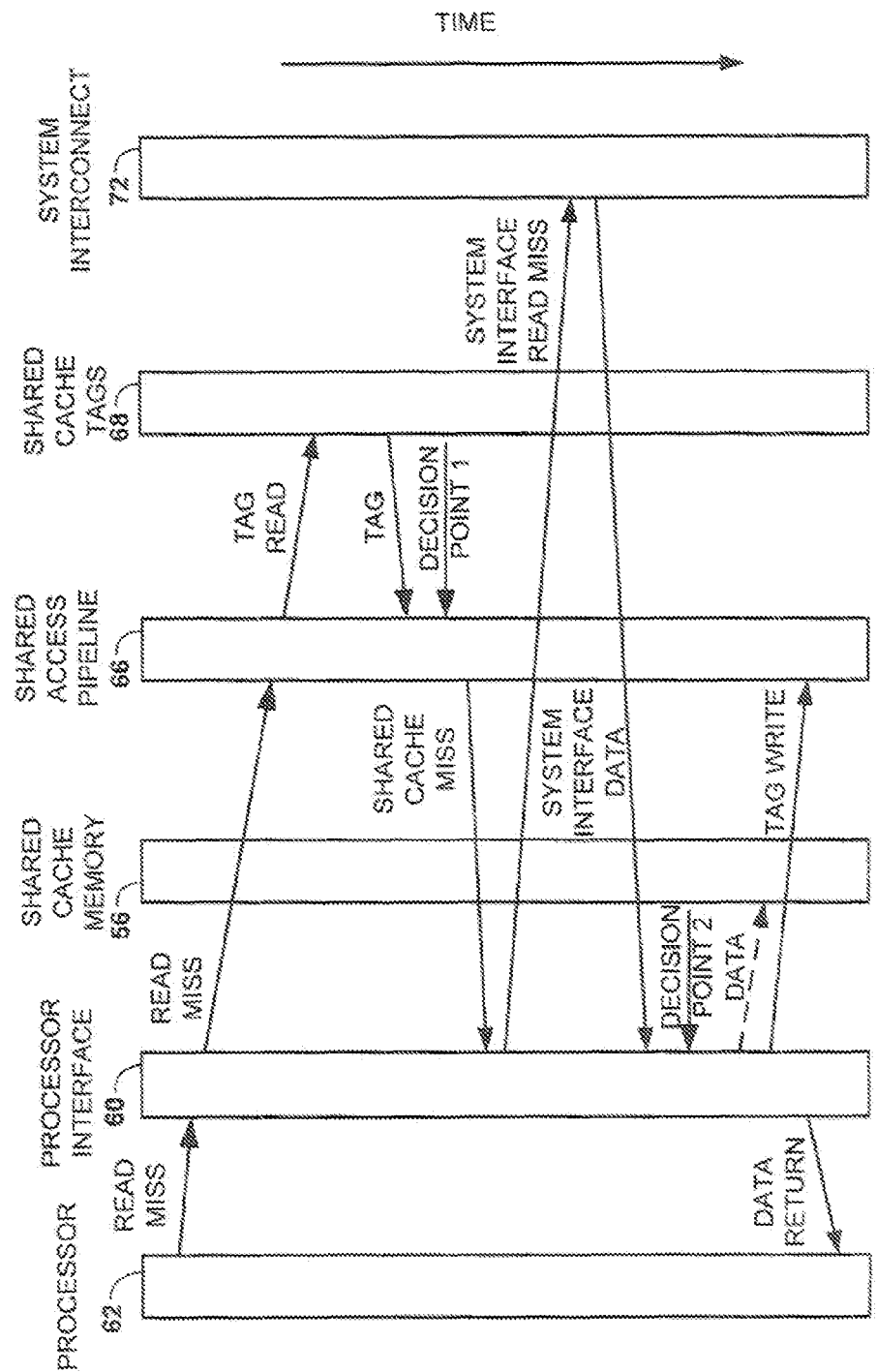
FIG. 4 depicts another exemplary embodiment of the multi-processor system illustrated in FIG. 2 processing a READ MISS.

FIG. 4 depicts an exemplary embodiment of the multi-processor system 50 illustrated in FIG. 2 processing a READ MISS from, one of the plurality of processors, wherein the shared cache memory 56 does not contain a coherent copy of data requested by the READ MISS (e.g., shared cache memory 56 miss). In FIG. 4, the signals are processed sequentially in reference to a time indicator (TIME). Additionally, signals in FIG. 4 with similar broken line patterns indicate a particular course of action if certain conditions are met, the conditions being discussed below. The READ MISS can be issued by one of the N processors 62, for example, if the processor 62 searches an associated local cache 64 for one or more cache lines, and the one or more cache lines has an invalid coherency state (an 'I' state). The processor 62 issues the READ MISS to the processor interface 60, the READ MISS requesting a coherent copy of data stored in a particular cache line. In response, the processor interlace 60 processes the READ MISS at the shared access pipeline 66. The shared access pipeline 66 causes the processor interface 60 to request a shared cache tag (TAG READ) from the shared cache tags 68 that is associated with the cache line requested by the READ MISS.

When the shared cache tag is returned to the shared access pipeline 66 (TAG), the shared access pipeline 66 identifies the coherency state of the cache line, and identifies the owner(s) of the cache line. If the shared cache tag returned to the shared access pipeline 66 indicates that the shared cache memory 56 does not contain a coherent copy of the data (SHARED CACHE MISS), the processor interface 60 issues a SYSTEM INTERFACE READ MISS on the system interconnect 72. The processor interlace 60 typically receives a response to the SYSTEM INTERFACE READ MISS via the system, interface 70 that includes a coherent copy of the data requested by the processor 62 (SYSTEM INTERFACE DATA). The processor interface 60 can forward the coherent copy of the data to the processor 62 (DATA RETURN).

At a DECISION POINT 1 (e.g., an early decision point), a determination by the shared access pipeline 66 (based on conditions discussed below) is made if the shared cache memory 56 does not store a coherent copy of the data, requested by the READ MISS, if the determination is positive, a block of memory (e.g., one or more cache lines) in the shared cache memory 56 can be allocated, for the data requested by the READ MISS. If the determination at the DECISION POINT 1 is negative, space (e.g., one or more cache lines) in the shared cache memory 56 is not allocated for the data requested by the READ MISS.

The determination at DECISION POINT 1 can be made on at least one of the following conditions. As an example, the first condition for the DECISION POINT 1 could be based on an examination of a current level of activity of the non-inclusive cache system 52. The level of activity of the non-Inclusive cache system 52 can be determined, for example, by the shared access pipeline 66 examining the size of one or more I/O data queues at the shared cache, memory controller 58, the shared cache memory 56 and/or the system interlace 70. If the level of activity of the non-inclusive cache system 52 is determined to be below a programmable threshold value, the first condition could be positive, but if the level of activity is determined to be at or above the programmable threshold value, the first condition could be negative.

The second condition for the DECISION POINT 1 can be based on the type of request associated with the READ MISS. For example, the second condition could be based on whether the READ MISS is based on a store miss or a load miss. If the READ MISS is based on a load miss, the second condition, could be positive. If the READ MISS is based on a store miss, the second condition could be negative.

The third condition for the DECISION POINT 1 can be based on the state of the shared cache memory 56. As an example, certain cache lines in the shared cache memory 56 can be inoperative (e.g., faulty). If there are a sufficient number of usable cache lines in the shared cache memory 56 to allocate the block of memory in the shared cache memory 56, the third condition can be positive. The number of usable cache lines can be, for example, the number of operable (e.g., not faulty) cache lines in the shared cache memory 56 with either an invalid state ('I' state) or an indication that the cache line data stored at the particular cache line has not been recently used. The recentness of use of a cache line can be indicated, for example, by a field of a shared cache tag associated with the cache line. Conversely, if there are an insufficient number of usable cache lines in the shared cache memory 56 to allocate the block of memory in the shared cache memory 56, the third condition can be negative.

The fourth condition for the DECISION POINT 1 can be based on the shared access pipeline 66 examining whether the non-inclusive shared cache system 52 has a currently pending request for the data requested by the READ MISS from a remote processor, such as one of die other nodes 76 (e.g., by a system snoop). If such a request is pending, the fourth condition, can be negative. If such a request is not pending, the fourth condition can be positive.

The fifth condition for the DECISION POINT 1 can be based on a replacement coherency state for the cache lines that could be allocated for the block of memory. For example, if one or more of the cache lines in the shared cache memory 56 that would be allocated for the block of memory, requires eviction buffer resources, the eviction buffer can be examined by the shared access pipeline 66 and/or the shared cache memory controller 58. If the eviction buffer is not full, the fifth condition can be positive. Conversely, if the eviction buffer is full, the fifth condition can be negative. Alternatively, if the cache lines that would be allocated for the block of memory do not require eviction buffer resources, the data requested by the READ MISS could be written to the shared cache memory 56 without an eviction, and thus, the fifth condition could be positive. If one or more of the conditions discussed above is negative, the determination, at DECISION POINT 1 can be negative. Alternatively, if all of the conditions discussed above are positive, the determination at DECISION POINT 1 can be positive. It will be appreciated by those skilled in the art that other combinations of the conditions, and/or other conditions can be considered.

At a DECISION POINT 2 (e.g., a late decision point), a determination can be made by the shared access pipeline 66 (based on one or more conditions discussed below) if the determination made at the DECISION POINT 1 was positive, such that the determination indicated that the memory block in the shared cache memory 56 should be allocated for the data requested by the READ MISS. At the DECISION POINT 2 the allocation for the memory block can be aborted if the determination made at the DECISION POINT 2 is negative. Conversely, if the determination made at the DECISION POINT 2 is positive, the allocation for the memory block is not aborted.

The first condition for the DECISION POINT 2 can be based on the shared, access pipeline 66 examining the origin of data provided by the SYSTEM INTERFACE DATA. For instance, the SYSTEM INTERFACE DATA signal could include an identifier, such as a packet identifier, that indicates the provider of die data, provided with the SYSTEM INTERFACE DATA signal. As an example, the identifier could indicate if the data provided with the SYSTEM INTERFACE DATA signal was provided from the system memory 74 or a cache associated with one of the other nodes 76. In such a situation, the shared access pipeline 66 could be configured to make the first condition positive if the data provided with the SYSTEM INTERFACE DATA signal was provided from the system memory 74. Conversely, the shared access pipeline 66 could be configured to make the first condition negative if the data provided with the SYSTEM INTERFACE DATA signal was provided, from a cache associated with one of the other nodes 76.

The second condition for DECISION POINT 2 can be based on a current level of activity of the non-inclusive cache system 52. The level of activity of the non-inclusive shared cache system 52 could be determined by the shared access pipeline 66, in a manner described above. If the level of activity of the shared cache system 52 is below the programmable threshold value, the second condition can be positive. If the level of activity of the shared cache system 52 is at or above the programmable threshold value, the second condition can be negative. If one or more of the conditions considered at DECISION POINT 2 is negative, the determination at DECISION POINT 2 can be negative. Alternatively, if all of the conditions considered at DECISION POINT 2 are positive, the determination at DECISION POINT 2 can be positive, it will be appreciated by those skilled in the art that other combinations of conditions, and/or other conditions can be considered.

If the determination at both the DECISION POINT 1 and the DECISION POINT 2 are positive the processor interface 60 writes the data returned by the SYSTEM INTERFACE DATA to the shared cache memory 56 (DATA), and updates a tag of the shared cache tags 68 associated with the data requested by the READ MISS (TAG WRITE). If the determination at either the DECISION POINT 1 or the DECISION POINT 2 is negative, the processor interlace 60 does not write or allocate space for the data returned by the SYSTEM INTERFACE DATA signal to the shared cache memory 56, and the shared cache tag can be updated accordingly (TAG WRITE).

Figure 5:
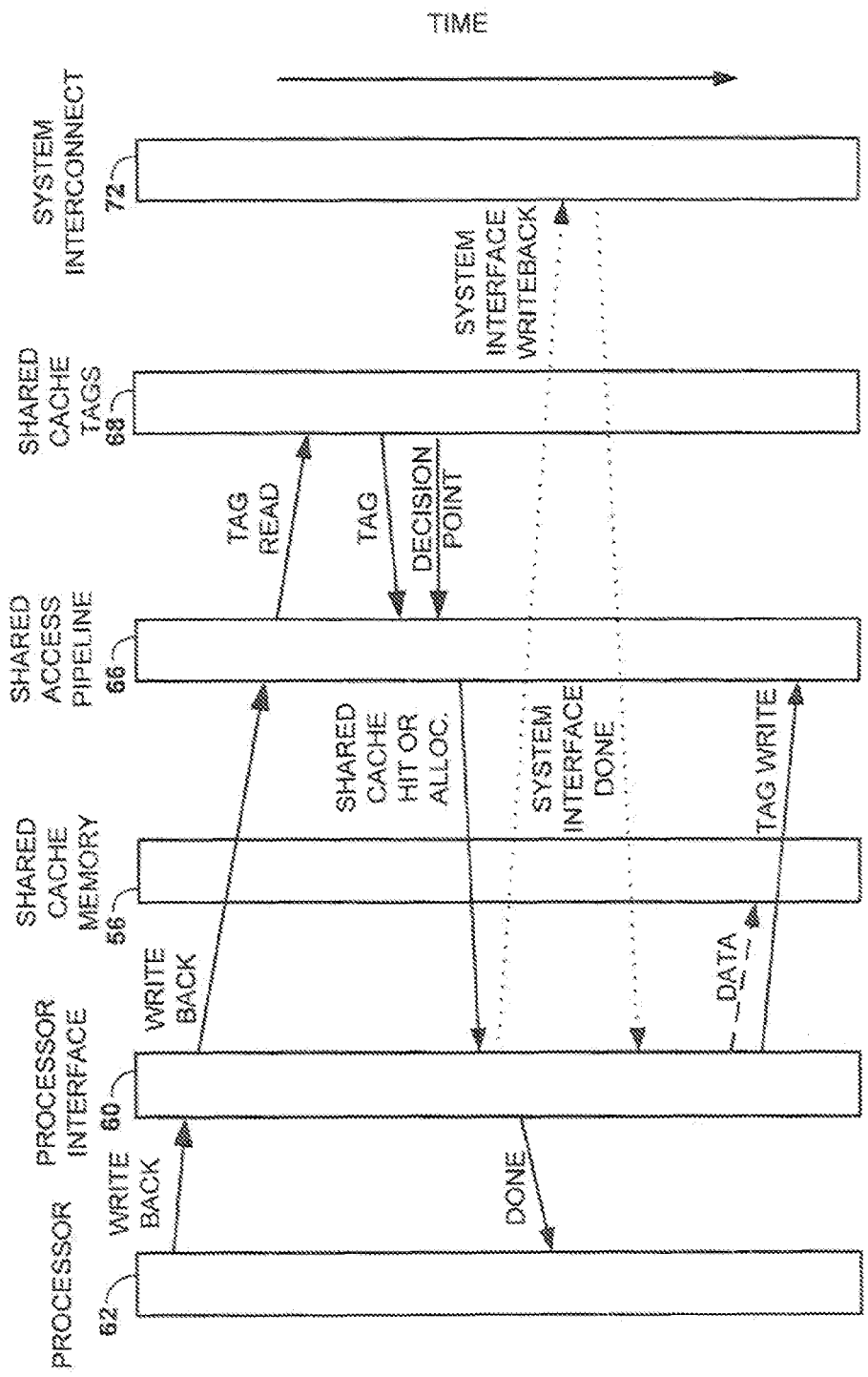
FIG. 5 depicts an exemplary embodiment of the multi-processor system illustrated in FIG. 2 processing a WRITE-BACK.

FIG. 5 depicts an exemplary embodiment of the multi-processor system 50 illustrated in FIG. 2 processing a WRITEBACK from one of the N processors 62. In FIG. 5, the signals are processed sequentially in reference to a time indicator (TIME). Additionally, signals in FIG. 5 with similar broken line patterns, indicate a particular course of action if certain conditions are met, the conditions being discussed below. The WRITEBACK can be issued by one of the N processors 62, for example, if the processor 62 is evicting a cache line from the processor's local cache 64. The processor issues the WRITEBACK to the processor interface 60, the WRITEBACK, can include a coherent copy of data (e.g., WRITEBACK data) to update a corresponding memory location (e.g., a cache line) for the WRITEBACK data. In response, the processor interface 60 processes the WRITEBACK at the shared access pipeline 66. The shared access pipeline 66 causes the processor interface 69 to request a shared cache tag (TAG READ) from the shared cache tags 68 that is associated with the cache line of the WRITEBACK data. When the shared cache tag is returned to the shared access pipeline 66 (TAG), the shared access pipeline 66 identifies the coherency state of the cache line, and identifies the owner(s) of the cache line. The shared access pipeline 66 causes the processor interface 60 to issue a SHARED CACHE HIT OR ALLOC signal that can indicate if a memory block (e.g., one or more cache lines) can be or already has been allocated for the WRITEBACK data in the shared cache memory 56.

At a DECISION POINT, a determination by the shared access pipeline 66 (based on conditions discussed below) can be made. If the determination at the DECISION POINT is positive, the shared access pipeline 66 causes the processor interface 60 to issue a completion signal (DONE) to the processor 62, and the processor interface 60 writes the WRITEBACK data to the shared cache memory 56 (DATA), and updates the shared cache tag accordingly (TAG WRITE). It is to be understood that the completion signal (DONE) could be issued to the processor 62 before the WRITEBACK data is written to the shared cache memory 56.

Alternatively, if the determination made at the DECISION POINT is negative, the shared access pipeline 66 causes the processor interface 60 to issue a SYSTEM INTERFACE WRITEBACK of the WRITEBACK data to the system memory 74 via the system interconnect 72, whether or not a space in the shared cache memory 56 has been or can be allocated for the WRITEBACK data (as indicated by SHARED CACHE HIT OR ALLOC). The processor interlace 60 issues a completion signal (DONE) to the processor 62, and the processor interface 60 receives a completion signal via the system interconnect 72 (SYSTEM INTERFACE DONE) indicating that the WRITEBACK data, has been written to the system memory 74. Additionally, the shared cache tag is updated accordingly (TAG WRITE), it is to be understood that the completion signal (DONE) could be issued to the processor 62 before the processor interface 60 receives the SYSTEM INTERFACE DONE signal.

The determination at the DECISION POINT can be made on at least one of the following conditions. As an example, the first condition for the DECISION POINT could be based on an examination of a current level of activity of the non-inclusive cache system 52. The level of activity of the non-inclusive cache system 52 can be determined, for example, by the shared access pipeline 66 examining the size of one or more I/O data queues at the shared cache memory controller 58, the shared cache memory 56 and/or the system interface 70. If the level of activity of the non-inclusive cache system 52 is determined to be below a programmable threshold value, the first condition, could be positive, but if the level of activity is determined to be at or above the programmable threshold value, the first condition could be negative.

The second condition for the DECISION POINT cm be based on the state of the shared cache memory 56 as indicated by the SHARED CACHE HIT OR ALLOC signal. As an example, certain cache lines in the shared cache memory 56 can be inoperative (e.g., faulty). If there are a sufficient number of usable cache lines in the shared cache memory 56 to allocate the block of memory in the shared cache memory 56, the second condition can be positive. The number of usable cache hues can be, for example, the number of operable (e.g., not faulty) cache lines in the shared cache memory 56 with either an Invalid state ('I' state) or an indication, that the cache line data stored at the particular cache line has not been recently used. The recentness of use of a cache line can be indicated, for example, by a field of a shared cache tag associated with the cache line. Conversely, if there are an insufficient number of usable cache lines in the shared cache memory 56 to allocate the block of memory in the shared cache memory 56, the second condition can be negative.

The third condition for the DECISION POINT can be based on a replacement coherency state for the cache lines that could be allocated for the block of memory. For example, if one or more of the cache lines in the shared, cache memory 56 that would be allocated for the block of memory requires eviction buffer resources, the eviction buffer can be examined by the shared access pipeline 66 and/or the shared cache memory controller 58. If the eviction buffer is not full, the third condition can be positive. Conversely, if the eviction, buffer is full, the third condition can be negative. Alternatively, if each of the cache lines mat would be allocated for the block of memory do not require eviction buffer resources, the WRITEBACK data, could, be written to the shared cache memory 56 without an eviction, and thus, the third condition could be positive. If one or more of the conditions discussed above is negative, the determination at the DECISION POINT can be negative. Alternatively, if all of the conditions discussed above are positive, the determination at the DECISION POINT can be positive. It will be appreciated by those skilled in the art that other combinations of conditions, and/or other conditions can be considered.

Figure 6:
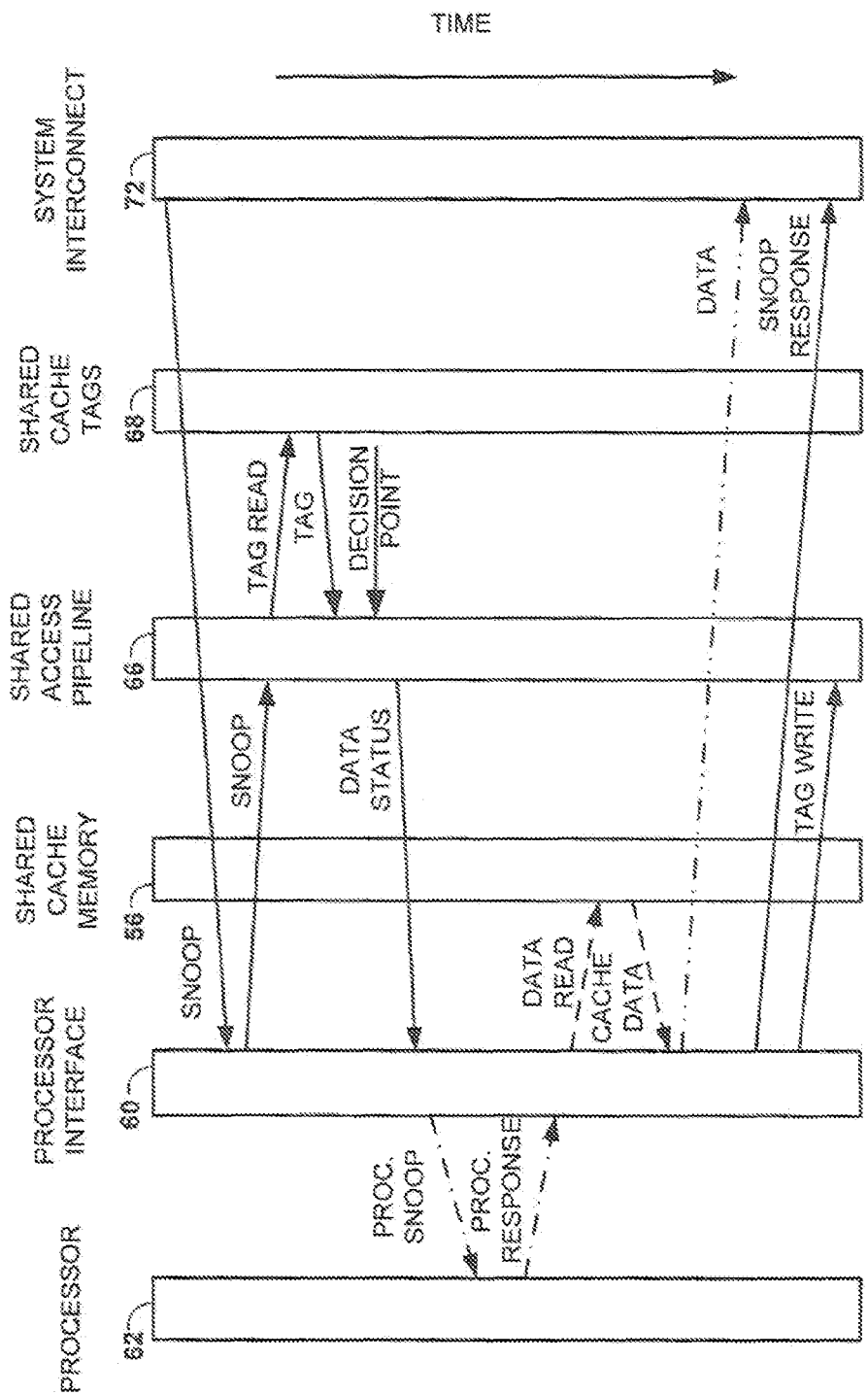
FIG. 6 depicts an exemplary embodiment of the multi-processor system illustrated in FIG. 2 processing a SNOOP.

FIG. 6 depicts an exemplary embodiment of the multi-processor system 50 illustrated in FIG. 2 processing a SNOOP for cache line data by a home node (e.g., one of the other nodes 76) of a cache line on the system, interconnect 72. The SNOOP can be provided, on the system interconnect 72 if a processor from one of the other nodes 76 is requesting a coherent copy of data stored in a cache line. Additionally, the SNOOP can identify the processor that is requesting the cache line data (e.g., a source node). In FIG. 6, the signals are processed sequentially in reference to a time indicator (TIME). Additionally, signals in FIG. 6 with similar broken line patterns indicate a particular course of action if certain conditions are met, the conditions being discussed below. The processor interlace 60 receives the SNOOP via the system interface 70. In response, the processor interface 60 processes the SNOOP at the shared access pipeline 66. The shared, access pipeline 66 causes the processor interface 60 to request a shared cache tag (TAG HEAD) from the shared cache tags 6S that is associated with the cache line of the SNOOP. When the shared cache tag is returned to the shared access pipeline 66 (TAG), the shared access pipeline 66 identifies the coherency state of the cache line, and identities the owner(s) of the cache line.

At a DECISION POINT, a determination by the shared access pipeline 66 can be made. The determination at the DECISION POINT can be based on information provided by the shared cache tag returned to the shared access pipeline 66 (TAG) and a current level of activity of the non-Inclusive cache system 52. The level of activity can be determined by, for example, the shared access pipeline 66 examining the size of one or more I/O date queues at die shared cache memory controller 58, the shared cache memory 56 and/or dm system interlace 70.

At the DECISION POINT, if the shared cache tag returned to the shared access pipeline 66 (TAG) indicates that the shared cache memory 56 contains an exclusively owned and unmodified coherent copy of the data requested by the SNOOP (DATA STATUS), and the shared cache tag indicates that none of the processor caches 64 contain a coherent copy of the data ('Eu' state), and the shared cache memory system 52 is below a programmable level of activity, the following process can occur. The processor interface 60 can read the cache line from the shared cached memory 56 (DATA READ), and the shared cache memory 56 can respond with the CACHE DATA. The CACHE DATA can be provided to the source node on the system interconnect 72 (DATA) and the processor interface 60 can provide a SNOOP RESPONSE that indicates a cache hit at the non-inclusive shared cache system 52. The shared cache tag can be updated (TAG WRITE) to invalidate the cache line associated with the shared cache tag returned to the shared access pipeline 66.

Alternatively, if the shared cache tag returned to the shared access pipeline 66 (TAG) indicates that the shared cache memory 56 contains an exclusively owned and unmodified coherent copy of the data (DATA STATUS) and the shared cache tag indicates that none of the processor caches 64 contain a coherent copy of the data ('Eu' state), hut the level, of activity of the non-inclusive shared cache memory system 52 is at or above the programmable threshold value, the following process can occur. The shared access pipeline 66 can cause the processor interface 60 to provide a SNOOT RESPONSE to the home node on the system. Interconnect 22 that indicates a cache miss at the non-inclusive shared cache system 52. In such a situation, the shared cache tag can be updated (TAG WRITE) to invalidate the cache line associated with the shared cache tag whether or not the shared cache memory 56 contained a coherent copy of the data requested by the SNOOP.

As another alternative, if the shared cache tag returned to the shared access pipeline 66 (TAG) indicates that the shared cache memory 56 contains an exclusively owned and modified ('M' state or 'Mu' state) coherent copy of the data (DATA STATUS), the following process can occur. The data requested by the SNOOP can be read from the shared cache memory 56 (DATA READ) and returned to the processor interlace 60 (CACHE DATA). The processor interface 60 can forward the data provided by the CACHE DATA signal to the source node (DATA). The processor interface 60 can provide the home node with a SNOOP RESPONSE that indicates a cache hit at the non-inclusive shared, cache system 52 on the system interconnect 72. Additionally, the shared cache tag can be updated (TAG WRITE) to invalidate the cache line associated with the shared cache tag.

As yet another alternative, if the shared cache tag returned to the shared access pipeline 66 (TAG) indicates that the shared cache memory 56 does not contain a coherent copy of the data ('I' state) or indicates that that the shared cache memory 56 has a shared copy of the data ('S' state) the following process can occur. The shared access pipeline 66 can cause the processor interface 60 to provide a SNOOP RESPONSE to the home node that indicates a cache miss at the non-inclusive cache system 52 on the system interconnect 72. Additionally, the shared cache tag can be updated accordingly, (TAG WRITE).

In still another alternative, if the shared cache tag returned to the shared access pipeline 66 (TAG) indicates that the shared cache memory 56 contains an exclusively owned unmodified coherent copy of the data (DATA STATUS), and that at least one of the processor caches 64 contain a coherent copy of the data ('E' state), the following process can occur. The shared access pipeline 66 can cause the processor interlace 60 to snoop a coherent copy of the data requested by the SNOOP from a processor 62 that is associated with a cache 64 that contains a coherent copy of the data (PROC. SNOOP). The processor 62 can respond to the PROC. SNOOP with the data (if the cache 64 associated with the processor 62 still contains a coherent copy of the data) (PROC. RESPONSE) and art indication of the coherency state of the data, if the PROC. RESPONSE indicates that the data provided is a coherent copy of the data (e.g., an 'E' state or an 'M' state), the shared access pipeline 66 can cause the processor interface 60 to provide the data provided by the PROC. DATA signal to the source node (data). Additionally, the processor interlace 60 can provide a cache hit for the non-Inclusive shared cache system 52 to the home node on the system interconnect 72 (SNOOP RESPONSE) and update the shared cache tag accordingly (TAG WRITE).

If the PROC. RESPONSE indicates that the cache 64 associated with the processor 62 no longer contains a coherent copy of the data ('I' state), and the shared cache memory system 52 is below a programmable level of activity, the following process can occur. The data requested by the SNOOP can be read from, the shared cache memory 56 (DATA READ) and returned to the processor interface 60

(CACHE DATA). The processor interface 60 can forward the data provided by the CACHE DATA, signal to the source node (DATA). The processor interface 60 can provide the home node with a SNOOP RESPONSE that indicates a cache hit at the non-Inclusive shared cache system 52 on the system interconnect 72 and update the shared cache tag accordingly (TAG WRITE).

Conversely, if the PROC. RESPONSE indicates that the cache 64 associated with the processor 62 no longer contains a coherent copy of the data ('I' state), but the level of activity of the non-inclusive shared cache memory system 52 is at or above the programmable threshold value, the following process can occur. The shared access pipeline 66 can cause the processor interface 60 to provide a SNOOP RESPONSE to the home node on the system interconnect 72 that indicates a cache miss at the non-inclusive shared cache system 52. In such a situation, the shared, cache tag can be updated (TAG WRITE) to invalidate the cache line associated with the shared cache tag whether or not the shared cache memory 56 contained a coherent copy of the data requested by the SNOOP.

Figure 7:
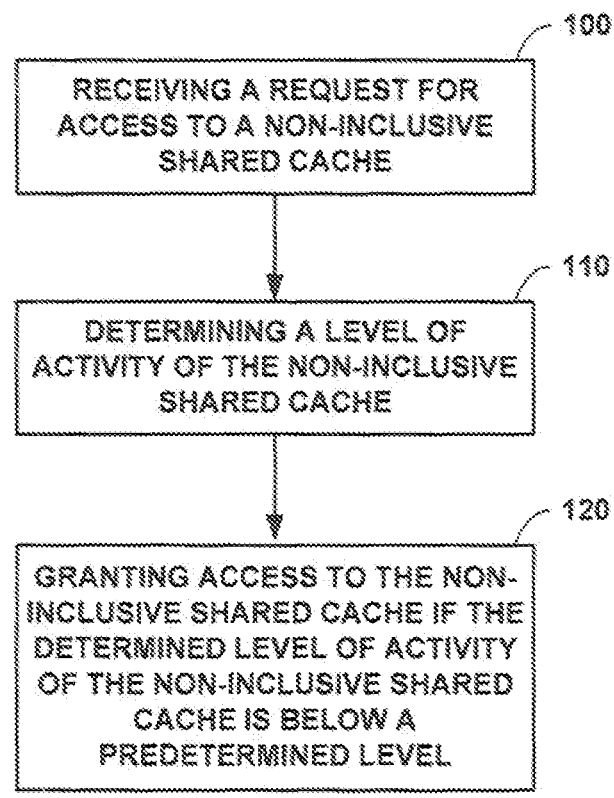
FIG. 7 is a flow diagram depicting an exemplary embodiment of a method for controlling access to a non-inclusive cache.

FIG. 7 depicts a flow diagram of an exemplary embodiment of a process. At 100 a request for access to a non-Inclusive shared cache is received. At 110 a level of activity of the non-Inclusive shared cache is determined. At 120, access to the non-inclusive shared cache is granted if the determined level of activity of the non-Inclusive shared cache is below a predetermined level.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A non-inclusive cache system comprising:
a non-inclusive cache; and
a cache agent that receives a request for access to the non-inclusive cache and denies the request for access to the non-inclusive cache if the non-inclusive cache system exceeds a predetermined level of activity;
wherein the cache agent processes the request if the request is granted access to the non-inclusive cache and forwards the request for processing if the request is denied access to the non-inclusive cache.

2. The system of claim 1, wherein the predetermined level of activity comprises a plurality of predetermined levels of activity, each of the predetermined levels of activity being associated with different requests for access to the non-inclusive cache.

3. The system of claim 1, the cache agent being configured to provide a cache miss if the request for access to the non-inclusive cache is denied.

4. The system of claim 1, wherein the denial of the request for access includes the cache agent being configured to not allocate space in the non-inclusive cache for data associated with the request for access if the request for access is based on a store miss.

5. The system of claim 1, wherein the denial of the request for access includes the cache agent being configured to not allocate space in the non-inclusive cache for data associated with the request for access if the request for access is based on a snoop signal.

6. A multi-processor system having a non-inclusive cache system, the multi-processor system comprising:
a first processor with an associated local cache that shares the non-inclusive cache system;
a second processor with an associated local cache that shares the non-inclusive cache system; and
a cache agent that receives a request for access to the non-inclusive cache from one of the first and second processors, and a system interconnect, the cache agent being configured to allow or deny access to the non-inclusive cache system based at least on a level of activity of at least a portion of the non-inclusive cache system, the cache agent further being configured to process the request if access to the non-inclusive cache is allowed and to forward the request for processing if access to the non-inclusive cache is denied.

7. The system of claim 6, wherein the level of activity is determined by the cache agent examining the size of one or more data queues.

8. The system of claim 7, wherein the cache agent is configured to deny access to the non-inclusive cache system if the size of at least one of the one or more data queues exceeds a predetermined threshold level.

9. The system of claim 6, further comprising a third processor communicatively coupled to the non-inclusive shared cache system by the system interconnect, and wherein the request for access to the non-inclusive shared cache is based on a cache-to-cache copy of at least one cache line between the local cache associated with one of the first and second processors, and a cache associated with the third processor, the cache agent being configured to not allocate space in the non-inclusive cache for data associated with the request for access.

10. The system of claim 6, wherein the request for access to the non-inclusive shared cache is based on a snoop of a cache line on the system interconnect, the cache agent being configured to deny the request if the local caches associated with the first and second processors do not have a coherent copy of the cache line.

11. The system of claim 6, wherein the request for access to the non-inclusive shared cache is based on a data writeback by one the first and second processors, wherein the cache agent is configured to provide a completion signal to the first processor before data associated with the request for access is written to the non-inclusive shared cache.

12. The system of claim 6, wherein each of the local caches associated with the first and second processors have at least one cache line of coherent data that is not also stored in the non-inclusive cache.

13. A system for controlling access to a non-inclusive cache, the system comprising:
means for processing a request for access to the non-inclusive shared cache;
means for allowing and denying access to the non-inclusive shared cache based on a level of activity of the system for controlling access; and
means for forwarding a request that has been denied access to the non-inclusive shared cache.

14. The system of claim 13, wherein the means for allowing and denying is also based on the type of request for access to the at least one non-inclusive shared cache.

15. The system of claim 13, further comprising:
means for allocating space in the non-inclusive cache; and
means for controlling the allocation of space in the non-inclusive cache based on a coherency state of data associated with the means for requesting access.

16. A method for controlling access to a non-inclusive cache comprising:
- receiving a request for access to the non-inclusive cache;
- determining a level of activity of the non-inclusive cache;
- granting access to the non-inclusive cache if the determined level of activity of the non-inclusive cache is below a predetermined level;
- denying access to the non-inclusive cache if the determined level of activity of the non-inclusive cache is at or above the predetermined level; and
- processing the request if the request is granted access to the non-inclusive cache and forwarding the request for processing if the request is denied access to the non-inclusive cache.

17. The method of claim 16 further comprising denying access to the non-inclusive cache if a level of activity associated with the non-inclusive cache meets or exceeds a predetermined threshold.

18. The method of claim 16, further comprising denying access to the non-inclusive cache if a level of activity associated with the non-inclusive cache meets or exceeds a predetermined threshold and/or if the request is based on a cache-to-cache copy between a local cache associated with one of at least two processors that share the non-inclusive cache and a cache associated with a third processor connected to the non-inclusive cache by a system interconnect.

19. The method of claim 16, further comprising denying access to the non-inclusive shared cache if a level of activity associated with the non-inclusive shared cache meets or exceeds a predetermined threshold and the requesting is based on a system snoop, wherein caches associated a plurality of processors that share the non-inclusive cache do not have a coherent copy of data requested by the system snoop.

20. The method of claim 16, further comprising storing at least one cache line of coherent data to at least one local cache associated with a processor that shares the non-inclusive cache in the absence of storing the at least one cache line of coherent data in the non-inclusive cache.

\* \* \* \* \*

UNITED STATES PATENT AND TRADEMARK OFFICE
CERTIFICATE OF CORRECTION

Page 1 of 1

| | |
|---|---|
| PATENT NO. | : 8,661,208 B2 |
| APPLICATION NO. | : 11/733857 |
| DATED | : February 25, 2014 |
| INVENTOR(S) | : Craig Warner et al. |

It is certified that error appears in the above-identified patent and that said Letters Patent is hereby corrected as shown below:

In the Claims:

In column 12, line 43, in Claim 11, delete "one" and insert -- one of --, therefor.

Signed and Sealed this
Sixteenth Day of September, 2014

Michelle K. Lee
*Deputy Director of the United States Patent and Trademark Office*